United States Patent [19]
Matsuda

[11] Patent Number: 5,329,575
[45] Date of Patent: Jul. 12, 1994

[54] IDLE CHANNEL RETRIEVING METHOD AND CORDLESS COMMUNICATIONS SYSTEM USING THE SAME

[75] Inventor: Koji Matsuda, Kawasaki, Japan

[73] Assignee: Fujitsu Limited, Kawasaki, Japan

[21] Appl. No.: 691,464

[22] Filed: Apr. 25, 1991

[30] Foreign Application Priority Data

Apr. 26, 1990 [JP] Japan .................... 2-111195

[51] Int. Cl.$^5$ .......................................... H04M 11/00
[52] U.S. Cl. ....................................... 379/63; 379/61; 379/58
[58] Field of Search ............... 379/61, 62, 63, 57, 379/58, 59; 455/34.1, 34.2, 56.1, 33.1

[56] References Cited

U.S. PATENT DOCUMENTS

| | | | |
|---|---|---|---|
| 4,672,657 | 6/1987 | Dershowitz | 379/63 |
| 4,744,101 | 5/1988 | Saegusa | 379/61 |
| 4,881,271 | 11/1989 | Yamauchi et al. | 379/59 |
| 4,894,856 | 1/1990 | Nakanishi et al. | 379/61 |
| 4,932,049 | 6/1990 | Lee | 379/59 |
| 4,965,849 | 10/1990 | Kunihiro | 379/61 |

FOREIGN PATENT DOCUMENTS

| | | |
|---|---|---|
| 10055097 | 6/1982 | European Pat. Off. . |
| 20335742 | 10/1989 | European Pat. Off. . |
| 58341 | 3/1986 | Japan . |
| 299533 | 12/1988 | Japan . |

Primary Examiner—Jin F. Ng
Assistant Examiner—George J. Oehling

[57] ABSTRACT

A cordless communication system includes a plurality of cordless communication devices, a plurality of connection units which couple the cordless communication devices and communication lines, and a control unit which controls connections between the connection units and the cordless communication devices. The control unit includes a retrieval range specifying part for specifying idle channel retrieving ranges within which connection units which are idle respectively retrieve idle channels so that the connection units which are idle share a retrieval procedure for retrieving idle channels from all the channels, and a control part for controlling the connection units so that the connection units which are idle retrieve idle channels within the idle channel retrieving ranges specified by the retrieval range specifying part.

19 Claims, 7 Drawing Sheets

FIG. 7

| CONNECTION UNIT ID NO. | 1 | 2 | 3 | 4 | 5 | 6 | 7 | 8 | 9 | 10 | ... | 84 | 85 | 86 | 87 |
|---|---|---|---|---|---|---|---|---|---|---|---|---|---|---|---|
| 1 | 0 | 1 | 0 | 0 | | | | | | | | | | | |
| 2 | 0 | 0 | 0 | 0 | | | | | | | | | | | |
| 3 | 0 | 0 | 0 | 1 | | | | | | | | | | | |
| 4 | 0 | 1 | 0 | 0 | | | | | | | | | | | |
| ... | | | | | | | | | | | | | | | |
| 87 | 1 | 0 | 0 | 0 | | | | | | | | | | | |

IDLE CHANNEL RETRIEVING METHOD AND CORDLESS COMMUNICATIONS SYSTEM USING THE SAME

BACKGROUND OF THE PRESENT INVENTION

The present invention generally relates to a cordless telephone system operated on a multi-channel access basis, and more particularly to a method for retrieving an idle channel.

A cordless telephone system comprises a fixed station and mobile stations connected via radio frequency (RF) links or channels. A handset unit or a cordless telephone set is provided at each mobile station, and a base unit is provided at the fixed station. The base unit comprises a control unit and a plurality of connection units.

Conventionally, when the connection units retrieve idle channels from radio frequency channels, each of the connection units accesses all channels allotted to its own unit (87 channels, for example), and holds information about idle channels. When a call from a mobile station is received, one of the idle channels is allotted to the call, so that an RF channel can be established.

However, the above-mentioned conventional idle channel retrieving process takes a long time since each of the connection units must search all the channels allotted thereto. During the time the idle channel retrieving process is being carried out, it is not possible for each connection unit to handle another job.

SUMMARY OF THE INVENTION

It is a general object of the present invention to provide an improved idle channel retrieving method in which the above-mentioned disadvantages are eliminated.

A more specific object of the present invention is to reduce the time necessary to retrieve an idle channel.

The above-mentioned objects of the present invention are achieved by a method for retrieving an idle channel in a system having a plurality of cordless communication devices, a plurality of connection units which couple the cordless communication devices to communication lines, and a control unit controlling the connection units, the system having a plurality of channels between the cordless communication devices and the connection units, the method comprising the steps of specifying, under control of the control unit, idle channel retrieving ranges within which connection units which are idle respectively retrieve idle channels so that the connection units which are idle share a retrieval procedure for retrieving idle channels from all the channels; and making the connection units which are idle retrieve idle channels within the idle channel retrieving ranges.

Another object of the present invention is to provide a cordless communication system using the above-mentioned idle channel retrieving method.

This object of the present invention is achieved by a cordless communication system comprising a plurality of cordless communication devices; a plurality of connection units which couple the cordless communication devices and communication lines; and a control unit which controls connections between the connection units and the cordless communication devices. The control unit comprises retrieval range specifying means for specifying idle channel retrieving ranges within which connection units which are idle respectively retrieve idle channels so that the connection units which are idle share a retrieval procedure for retrieving idle channels from all the channels; and control means for controlling the connection units so that the connection units which are idle retrieve idle channels within the idle channel retrieving ranges specified by the retrieval range specifying means.

BRIEF DESCRIPTION OF THE DRAWINGS

The objects, features and advantages of the present invention will become more apparent from the following detailed description when read in conjunction with the accompanying drawings, in which:

FIG. 7 is a diagram showing a map created during an idle channel retrieving procedure according to the embodiment of the present invention.

DESCRIPTION OF THE PREFERRED EMBODIMENTS

Figure 1:
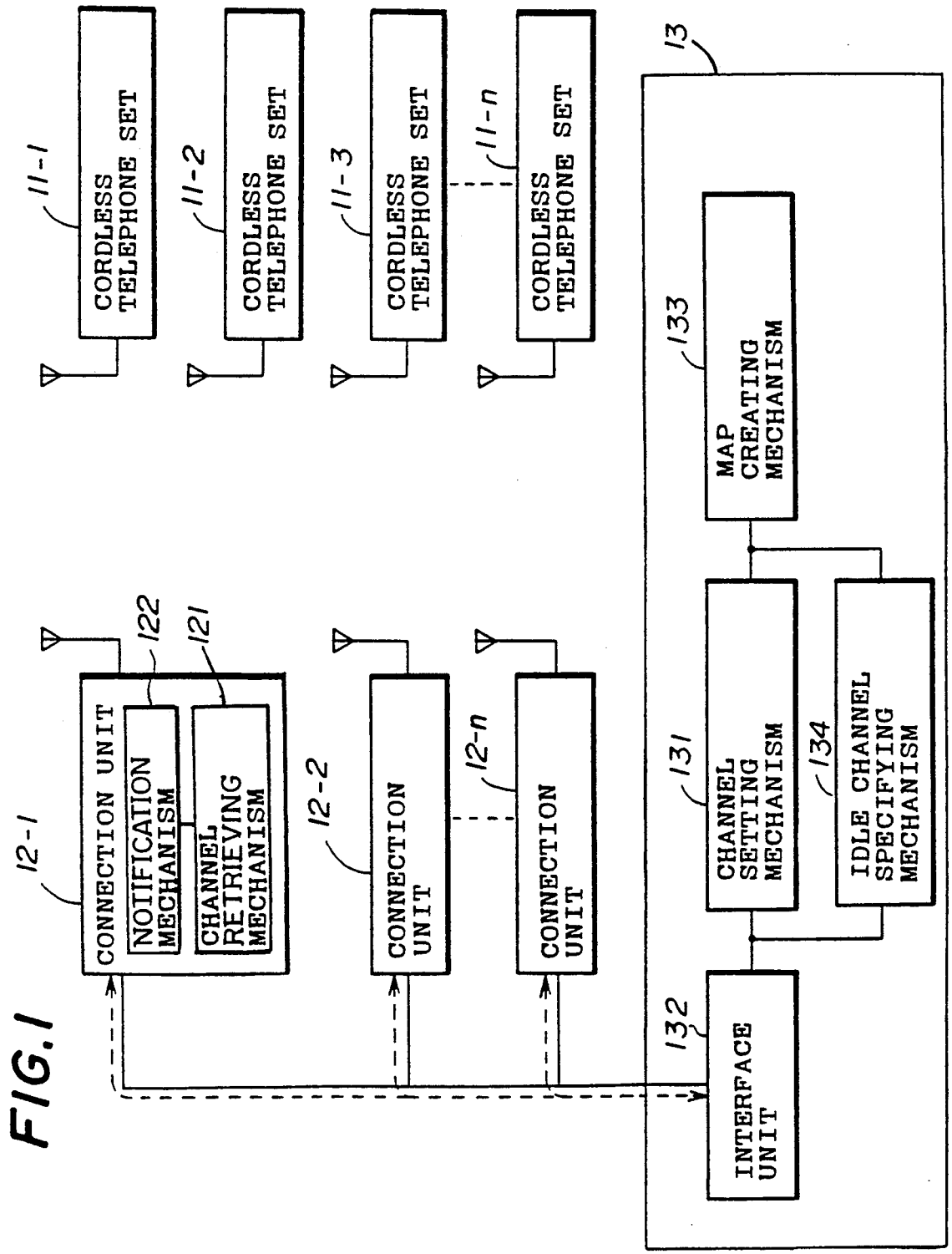
FIG. 1 is a block diagram of a cordless telephone system according to a preferred embodiment of the present invention.

FIG. 1 illustrates the outline of a cordless telephone system according to a preferred embodiment of the present invention. The cordless telephone system comprises cordless telephone sets 11-1 through 11-n (n is an arbitrary number), connection units 12-1 through 12-n, and a control unit 13. Normally, the number of connection units 12-1 through 12-n is smaller than that of the cordless telephone sets 11-1 through 11-n.

Each of the connection units 12-1 through 12-n comprises an idle channel retrieving mechanism 121 and a notification mechanism 122. The idle channel retrieving mechanism 121 receives an instruction specifying which channels out of all the channels provided in the system shown in FIG. 1 should be searched (idle channel retrieving range), and searches for idle channels from the specified channels. The notification mechanism 122 informs the control unit 13 of the results of the idle channel retrieval executed by the retrieving mechanism 121. All the channels provided in the system shown in FIG. 1 are grouped into a plurality of groups (idle channel retrieving range), and one of the groups is assigned to the respective connection units 12-1 through 12-n except for the communication unit or units, which are engaged in communication with one of the cordless telephone sets 11-1 through 11-n. For example, if only the connection unit 12-1 is engaged in communication with any one of the cordless telephone sets 11-1 through 11-n, all the channels are shared among the connection units 12-2 through 12-n. For this purpose, the control unit 13 periodically supervises all the connection units 12-1 through 12-n and judges whether or not they are busy. For example, the control unit 13 carries out the judgment operation at intervals equal to one second.

The control unit 13 comprises a channel setting mechanism (retrieval range setting mechanism) 131, an interface unit 132, a map creating mechanism 133 and an idle channel specifying mechanism 134, connected as shown in FIG. 1. The channel setting mechanism (idle channel retrieving range specifying mechanism) 131 determines which connection units should share the idle channel retrieving procedure, and groups all the channels into a plurality of groups related to the determined connection units. The interface unit 132 receives the result of the idle channel retrieval sent by the notification mechanism 122 of each of the connection units 12-1 through 12-n, and outputs the received results to the map creating mechanism 133. The interface unit 132 also receives an idle channel allocation request (connection request) from each of the connection units 12-1 through 12-n. The map creating mechanism 133 creates a map showing which channels are idle on the basis of the received results of the idle channel retrieval. The idle channel specifying mechanism 134 receives the idle channel allocation request from the interface unit 132, and specifies one idle channel, which does not have an interference with channels being used. Information showing the specified idle channel is transferred to the corresponding connection unit via the interface unit 132.

If n/2 connection units out of the n connection units 12-1 through 12-n are busy, the control unit 13 instructs the remaining n/2 connection units to retrieve idle channels in the specified respective groups of idle channels. In this case, it takes half the time necessary for retrieving idle channels in the conventional way to search for idle channels according to the present invention. It is possible to make some of the connection units which are not busy retrieve idle channels.

Figure 2:
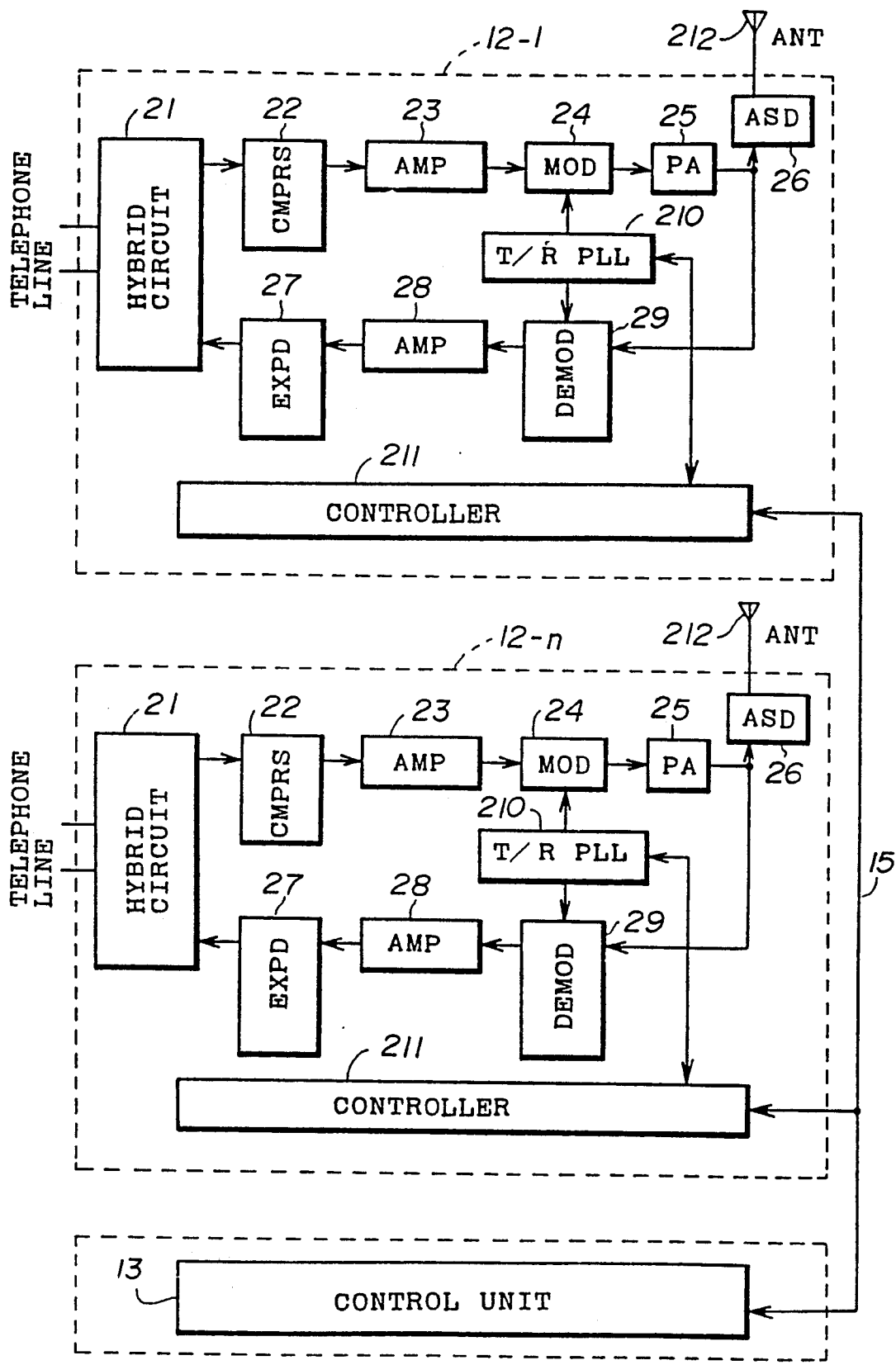
FIG. 2 is a block diagram illustrating the structures of connection units shown in FIG. 1.

FIG. 2 shows the connection units 12-1 and 12-n which are of the same structure. Each of the other connection units 12-2 through 12-n-1 is configured in the same way as the connection units 12-1 and 12-n. Each of the connection units 12-1 through 12-n includes a hybrid circuit 21, a compressor (CMPRS) 22, a low-frequency amplifier (AMP) 23, a modulator (MOD) 24, a power amplifier (PA) 25, an antenna sharing device (ASD) 26, an antenna (ANT) 212 and a transmit/receive PLL (phase locked loop) circuit (T/R PLL) 210. Further, each of the connection units 12-1 through 12-n includes a demodulator (DEMOD) 29, a low-frequency amplifier (AMP) 28, an expander (EXPD) 27 and a controller 211. All the structural components of each connection unit are interconnected as shown in FIG. 2.

The controller 211 controls the entire operation of the connection unit, as will be described later. The hybrid circuit 21 is connected to a telephone line, which extends to a switch. A signal input applied to the hybrid circuit 21 is sent to the compressor 22, which compresses the input signal. The compressed input signal is amplified by the low-frequency amplifier 23 and modulated by the modulator 24. The modulator 24 is controlled by the PLL circuit 210 so that it modulates the amplified signal from the low-frequency amplifier 23 at a frequency corresponding to an RF channel specified by the control unit 13. The modulated signal, which is a radio frequency signal, passes through the power amplifier 25 and the antenna sharing device 26, and is emitted via the antenna 212.

A radio frequency signal received by the antenna 212 passes through the antenna sharing device 26, and is demodulated by the demodulator 29. A demodulation frequency used in the demodulator 29 is supplied from the PLL circuit 210. Normally, the modulation frequency is the same as the demodulation frequency. A demodulated signal is amplified by the low-frequency amplifier 28, and expanded by the expander 27. Then, an expanded signal passes through the hybrid circuit 21, and sent to the corresponding telephone line. The controller 211 communicates with the control unit 13 via a data bus 15. Data on the data bus 15 is transferred on the time division base.

Figure 3:
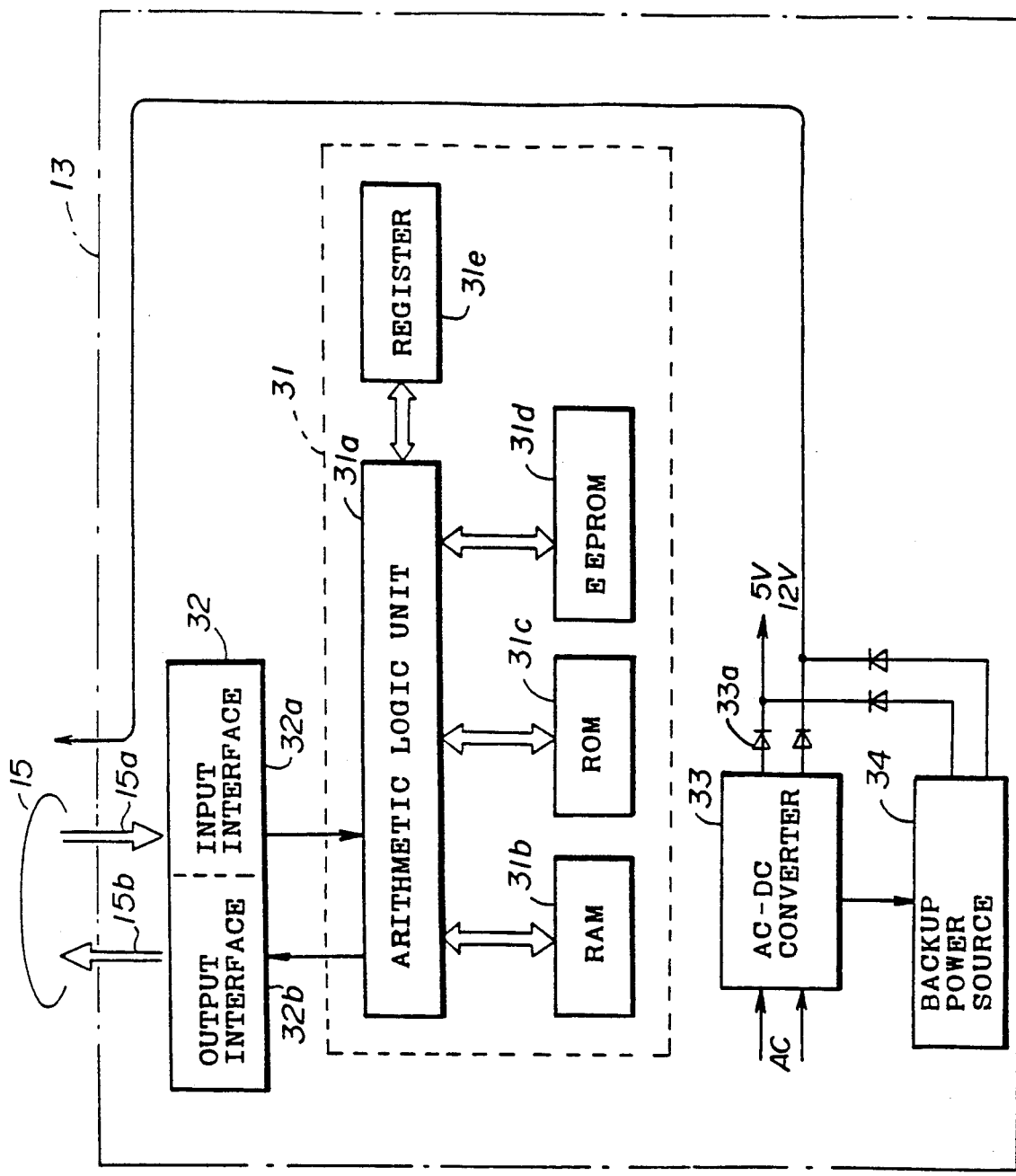
FIG. 3 is a block diagram of a control unit shown in FIG. 1.

FIG. 3 shows the structure of the control unit 13 in detail. As shown, the control unit 13 has a processor 31, such as a microprocessor, an interface circuit 32, an AC-DC converter 33 and a backup power source 34, such as a battery. The processor 31 includes an arithmetic logic unit 31a, a random access memory (RAM) 31b, a read only memory (ROM) 31c, an electrically erasable programmable read only memory (EEPROM) 31d and a register 31e. Programs defining the operation of the control unit 13 are stored in the ROM 31c. The RAM 31b serves as a working area of the arithmetic logic unit 31a. The EEPROM 31b stores a map, which will be described later. The register 31e temporarily stores data supplied from the arithmetic logic unit 31a. The interface circuit 32, which is connected to the arithmetic logic unit 31a, has an input data bus interface 32a connected to an input data bus 15a of the data bus 15, and an output data bus interface 32b connected to an output data bus 15b thereof. The AC-DC converter 33 converts an A.C. power supply voltage into D.C. power supply voltages equal to, for example, 5 V and 12 V, which are supplied to the connection units 12-1 through 12-n through diodes 33a. The D.C. power supply voltages are also supplied to the backup power source 34, and charge it. The D.C. power supply voltages are also supplied to the connection units 12-1 through 12-n.

The cordless telephone sets 11-1 through 11-n may be the same as disclosed in U.S. Pat. No. 4,894,856, the disclosure of which is herein incorporated by reference. Of course, another conventional cordless telephone set can be used.

Figure 4:
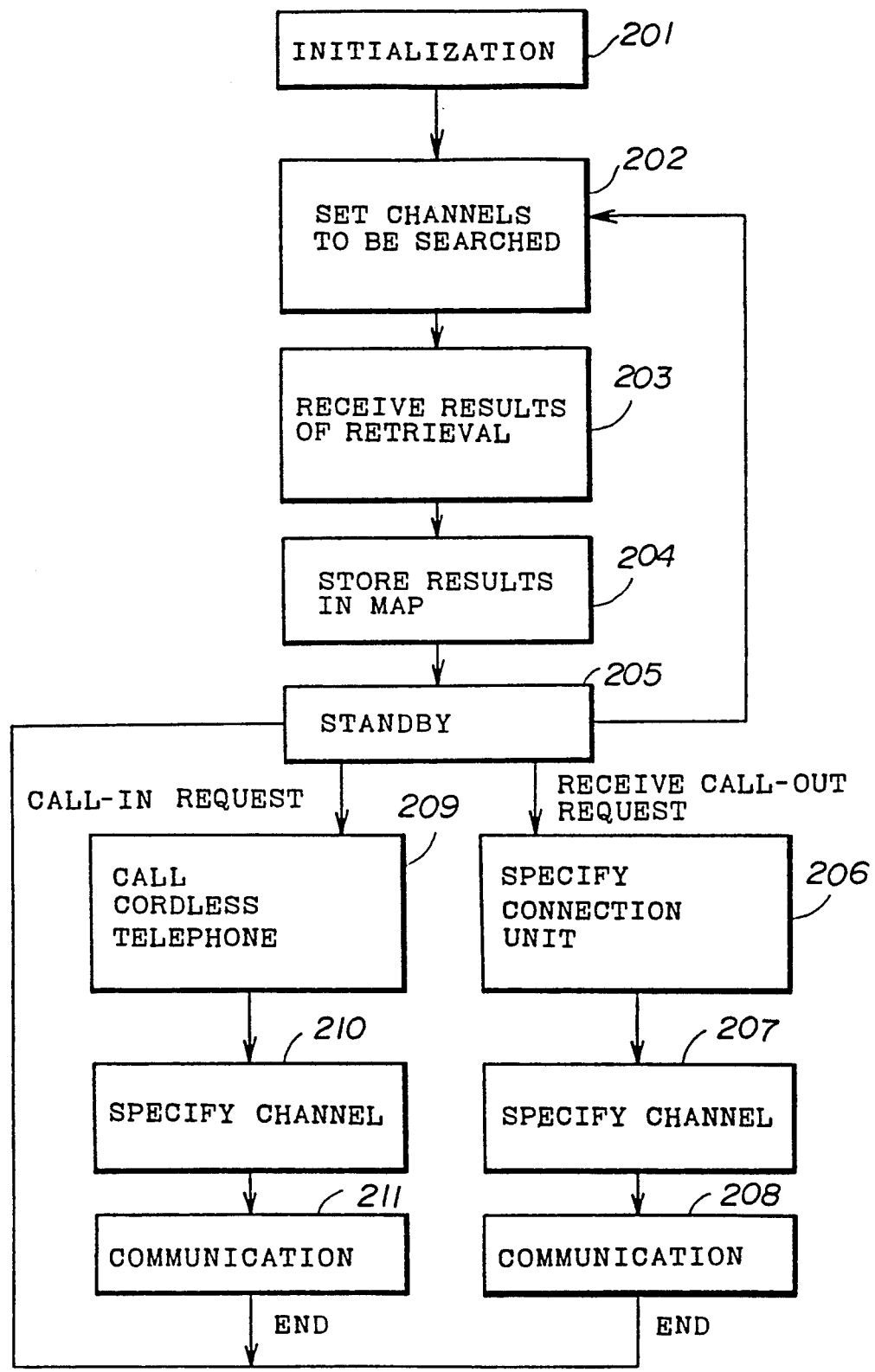
FIG. 4 is a flowchart showing the operation of the control unit shown in FIG. 3.
Figure 5:
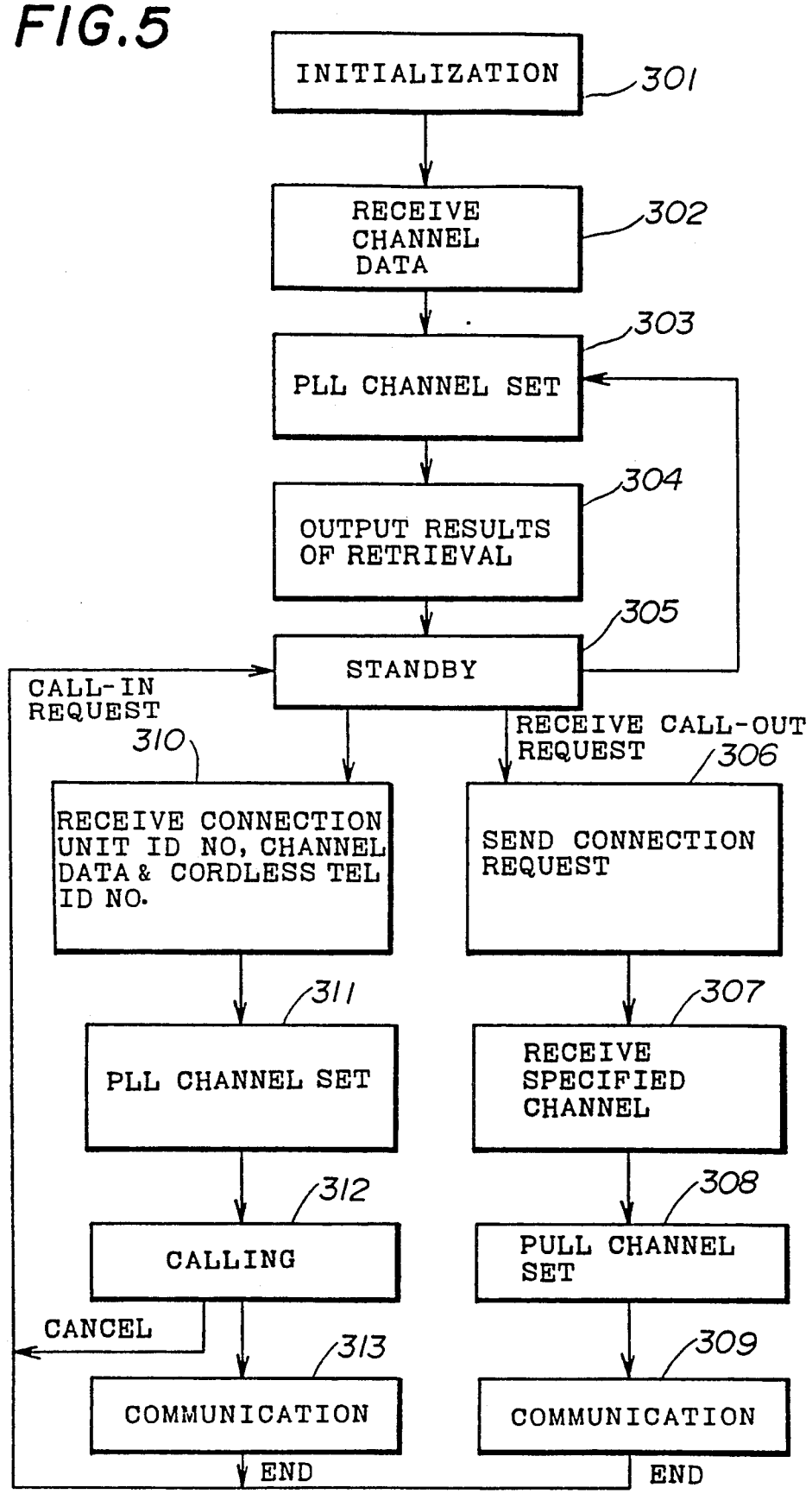
FIG. 5 is a flowchart showing the operation of each connection unit shown in FIG. 1.
Figure 6:
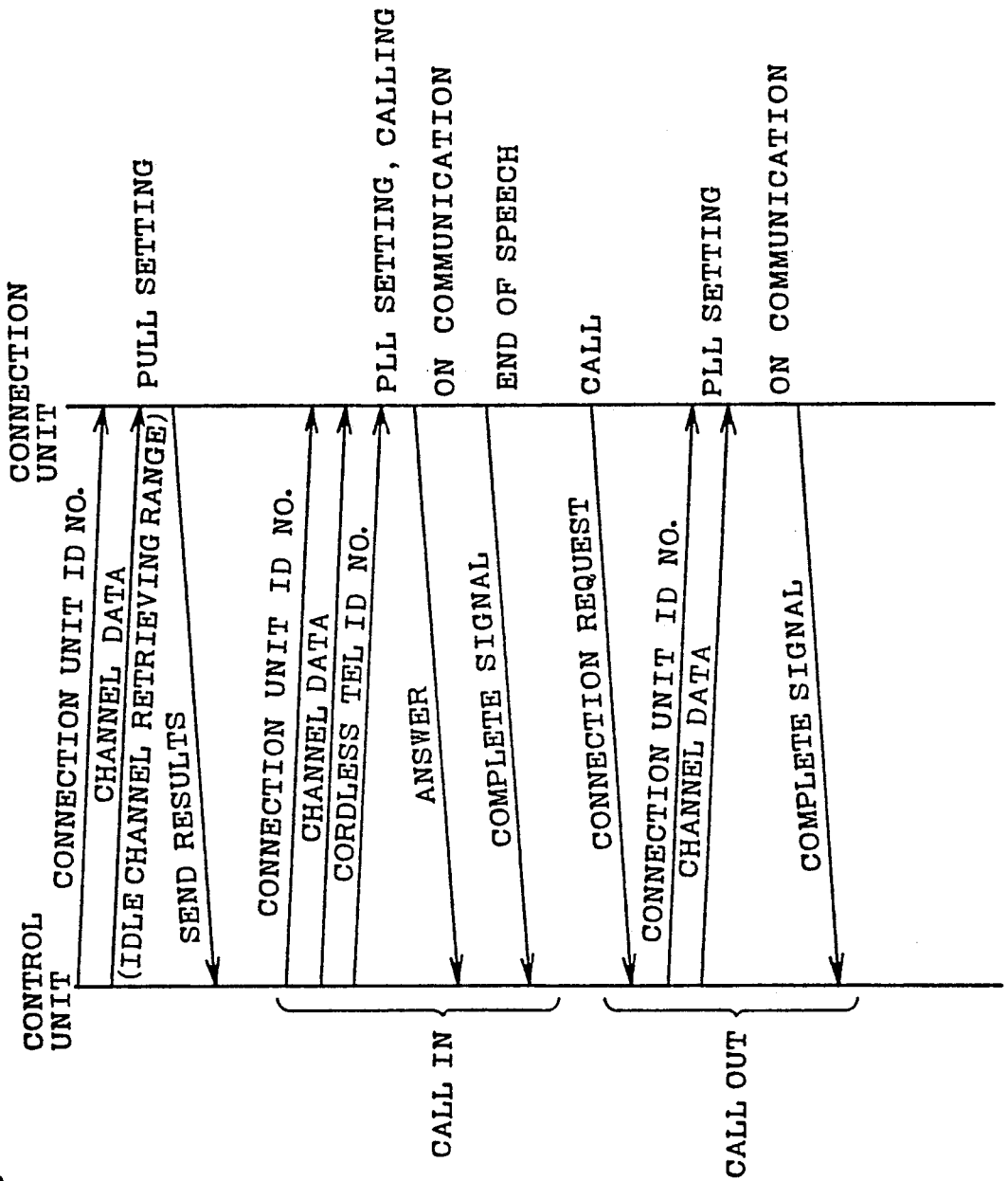
FIG. 6 is a diagram showing a communication procedure carried out between a connection unit and a cordless telephone set shown in FIG. 1.

A description will now be given of the operation of the cordless telephone system shown in FIGS. 1 through 3, with reference to FIGS. 4 through 7. FIG. 4 illustrates the operation of the control unit 13 carried out under the control of the processor 31 thereof (FIG. 3), and FIG. 5 illustrates the operation of each connection unit performed under the control of the controller 211 (FIG. 2). FIG. 6 is a signal transmit/receive sequence.

The processor 31 executes an initialization operation at step 201, and performs a channel setting operation on all or some of the connection units 12-1 through 12-n which are idle at step 202. During the channel setting operation, as shown in FIG. 6, the processor 31 successively outputs connection unit identification numbers of the specified idle connection units and channel data to the output data bus 15b via the output data bus interface 32b and the output data bus 15b. The processor 31 has already recognized the connection units which are busy because when each connection unit is switched to the busy state, it returns an answer signal to the control unit 13. The channel data following the connection unit identification number specifies an idle channel retrieval range which defines channels to be retrieved by the connection unit specified by the above connection unit identification number.

Each of the connection units 12-1 through 12-n executes an initialization operation at step 301 shown in FIG. 5, and then receives the connection unit identification number and the channel data at step 302. Then, the controller 211 determines whether or not the received channel connection identification number indicates its own connection unit. If the result of this determination is affirmative, at step 303, the controller 211 controls the PLL circuit 210 to sequentially change the oscillation frequency in accordance with the channels indicated by the received channel data. In other words, the PLL circuit 210 is sequentially set to the frequencies corresponding to the channels specified by the channel data. At step 304, the controller 211 outputs the results of the retrieving operation to the processor 31 via the input data bus 15a and the input data bus interface 32a, and shifts a standby mode at step 305. The processor 31 receives the results of the retrieval at step 203 shown in FIG. 4, and stores these results in a map formed in the EEPROM 31d.

FIG. 7 shows the above-mentioned map. As shown, the map shows whether or not each of the connection devices 12-1 through 12-n is busy (that is, whether or not each communication device is communicating with one of the cordless telephone sets (11-1 through 11-n) and which channel each busy connection unit is using. In FIG. 7, "1" indicates that the channel is busy, and "0" indicates that the channel is idle. After the states of the all the channels are obtained, the control unit 13 shifts to a standby state at step 205. The processor 31 has a timer, such as a software timer. When the timer counts a predetermined number corresponding to the interval at which the idle channel retrieving operation is periodically performed, the timer is reset and the procedure returns to step 202.

When one of the connection units 12-1 through 12-n receives a call from one of the cordless telephone sets 11-1 through 11-n, at step 306 shown in FIG. 5, it outputs a connection request to the control unit 13 via the input data bus 15a. Upon receiving the connection request, the processor 31 of the control unit 13 specifies one of the idle connection units by outputting the corresponding connection unit identification number at step 206, and specifies one idle channel by outputting corresponding channel data at step 207. During this operation, the specified channel is selected by referring to the map shown in FIG. 7 so that it has an interference with the channels being used. The connection unit specified by the connection unit identification number inputs the channel data at step 307 shown in FIG. 5, and establishes the specified channel by setting the PLL circuit 210 to the corresponding oscillation frequency, so that the corresponding RF channel and the telephone line connected to a subscriber called are electrically connected to each other. In this state, the communication is possible at steps 208 and 309. When the communication ends, the connection unit sends a complete signal to the controller unit 13.

On the other hand, when one of the connection units 12-1 through 12-n receives a call having a cordless telephone identification number from a subscriber via the corresponding telephone line, the processor 31 of the control unit 13 is informed of such a call, and specifies one of the idle connection units 12-1 through 12-n. Then, as shown in FIG. 6, the processor 31 outputs the corresponding connection unit identification number, channel data specifying one of the idle channels obtained by referring to the map shown in FIG. 7, and the cordless telephone identification number indicating the called cordless telephone set in this order. The controller 211 of the connection unit specified by the connection unit identification number receives these data at 310, controls the PLL circuit 210 at step 311 so that it oscillates at a frequency specified by the channel data. Then, the connection unit calls the cordless telephone set at step 312. When the called cordless telephone set sends back an answer signal, the connection controller returns an answer to the control unit 13, so that communication becomes possible at step 211 and 313. On the other hand, when the control unit 13 does not receive the answer signal from the connection unit being considered, it makes the connection unit stop the calling operation at step 312. When the communication ends, a complete signal is returned from the connection unit.

In the above-mentioned embodiment, the map is formed in the control unit 13. Alternatively, it is possible to provide each of the connection units 12-1 through 12-n with the map. Since the controller 211 is formed in the same way as the processor 31, the map can be formed in the EEPROM of the controller 211. In this alternative, the results of the retrieval output at step 304 shown in FIG. 5 are stored in its own memory and transferred to the other connection units via the data bus 15. Each of the connection units receives the results of the retrieval and replaces the contents of the map based thereon. When a call from one of the connection units is received, the controller 211 of the corresponding connection unit retrieves idle channels by referring to its own map.

The present invention is not limited to the specifically disclosed embodiments, and variations and modifications may be made without departing from the scope of the present invention.

What is claimed is:

1. A method for retrieving an idle channel in a system having a plurality of cordless communication devices, a plurality of connection units which couple said cordless communication devices to communication lines, and a control unit controlling said connection units, said system having a plurality of channels between said cordless communication devices and said connection units, said method comprising the steps of:

periodically supervising all connection units and determining which connection units are idle;

specifying, under control of said control unit, different channel retrieving ranges within which connection units which are idle respectively retrieve idle channels so that said connection units which are idle operate together to share a retrieval procedure for retrieving idle channels from all the channels in the system; and causing said connection units which are idle to retrieve idle channels within their respective channel retrieving ranges.

2. A method as claimed in claim 1, and further comprising the steps of:

creating a map indicating which channels are idle, and specifying one of said idle channels in response to a connection request from one of the connection units while referring to said map.

3. A method as claimed in claim 2, wherein said method further comprises the step of:

sending data indicating the specified idle channel to said one of the connection units which outputs said connection request.

4. A method as claimed in claim 1, wherein the step of specifying the channel retrieving ranges is carried out at predetermined intervals.

5. A method as claimed in claim 1, wherein said connection units which are idle are connection units other than connection units which are maintained in a busy state and engaged in communication with respective cordless communication devices.

6. A method as claimed in claim 2, wherein said connection units which are idle are other than connection units which are maintained in a busy state and engaged in communication with respective cordless communication devices.

7. A method as claimed in claim 1, wherein said method further comprising the step of:
determining whether or not each of said connection units is maintained in a busy state.

8. A method as claimed in claim 1, wherein said cordless communication devices comprise cordless telephone sets.

9. A cordless communication system comprising:
a plurality of cordless communication devices;
a plurality of connection units which couple said cordless communication devices and communication lines; and
a control unit which controls connection between said connection units and said cordless communication devices;
a plurality of channels between said cordless communication devices and said connection units;
said control unit comprising:
means for periodically supervising all connection units and determining which connection units are idle;
retrieval range specifying means for specifying different channel retrieving ranges within which connection units which are idle respectively retrieve idle channels so that said connection units which are idle operate together to share a retrieval procedure for retrieving idle channels from all the channels in the system; and
control means for controlling said connection units so that said connection units which are idle retrieve idle channels within their respective channel retrieving ranges specified by said retrieval range specifying means.

10. A cordless communication system as claimed in claim 9, further comprising:
map creating means for creating a map indicating which channels are idle; and
idle channel specifying means for specifying one of said idle channels in response to a connection request from one of the connection units while referring to said map.

11. A cordless communication system as claimed in claim 10, further comprising means for sending data indicating the specified idle channel specified by said idle channel specifying means to said one of the connection units which outputs said connection request.

12. A cordless communication system as claimed in claim 10, wherein said control unit comprises memory means for storing said map.

13. A cordless communication system as claimed in claim 9, wherein said retrieval range specifying means comprises means for indicating, as said connection units share said retrieval procedure, connection units other than connection units which are maintained in a busy state and engaged in communication with respective cordless communication devices.

14. A cordless communication system as claimed in claim 9, wherein said connection units each comprise:
memory means for storing a map indicating whether or not each of said connection units is idle; and
communicating means for communicating with other connection units and for transferring information stored in said map to the other connection units.

15. A cordless communication system as claimed in claim 9, wherein said cordless communication devices comprise cordless telephone sets.

16. A method for retrieving an idle channel in a system having a plurality of cordless communication devices, a plurality of connection units which couple said cordless communication devices to communication lines, and a control unit controlling said connection units, said system having a plurality of channels between said cordless communication devices and said connection units, said method comprising the steps of:
periodically supervising all connection units and determining which connection units are idle;
specifying, under control of said control unit, different channel retrieving ranges within which connection units which are idle respectively retrieve idle channels so that said connection units which are idle operate together to share a retrieval procedure for retrieving idle channels from all the channels in the system;
causing said connection units which are idle to retrieve idle channels within their respective channel retrieving ranges;
creating a map indicating which channels are idle; and
specifying one of said idle channels in response to a connection request from one of the connection units while referring to said map.

17. A method as claimed in claim 16, wherein said method further comprises the step of:
sending data indicating the specified idle channel to said one of the connection units which outputs said connection request.

18. A method as claimed in claim 16, wherein the step of specifying the channel retrieving ranges is carried out at predetermined intervals.

19. A cordless communication system comprising:
a plurality of cordless communication devices;
a plurality of connection units which couple said cordless communication devices and communication lines;
a control unit which controls connection between said connection units and said cordless communication devices; and
a plurality of channels between said cordless communication devices and connection units,
said control unit comprising:
means for periodically supervising all connection units and determining which connection units are idle,
retrieval range specifying means for specifying different channel retrieving ranges within which connection units which are idle respectively retrieve idle channels so that said connection units which are idle operate together to share a retrieval procedure for retrieving idle channels from all the channels in the system,
control means for controlling said connection units so that said connection units which are idle retrieve idle channels within their respective channel retrieving ranges specified by said retrieval range specifying means, map creating means for creating a map indicating which channels are idle, memory means for storing said map, and idle channel specifying means for specifying one of said idle channels in response to a connection request from one of the connection units while referring to said map.

* * * * *

UNITED STATES PATENT AND TRADEMARK OFFICE
CERTIFICATE OF CORRECTION

PATENT NO. : 5,329,575
DATED : July 12, 1994
INVENTOR(S) : Koji Matsushima

It is certified that error appears in the above-identified patent and that said Letters Patent is hereby corrected as shown below:

On the cover page please change the Inventor line to read:

--[75] Inventor: Koji Matsushima, Kawasaki-Shi, Japan--.

Signed and Sealed this

Twenty-seventh Day of September, 1994

Attest:

BRUCE LEHMAN

Attesting Officer — Commissioner of Patents and Trademarks